(No Model.) 2 Sheets—Sheet 1.
O. T. WELCH.
THILL COUPLING.
No. 471,690. Patented Mar. 29, 1892.
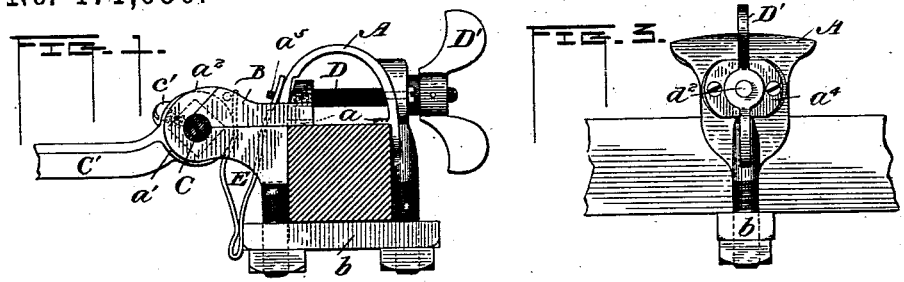
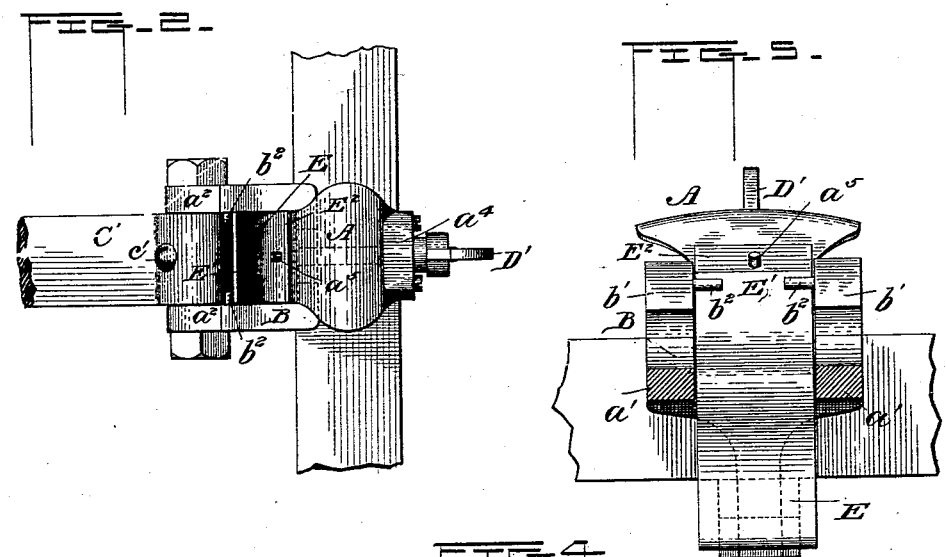
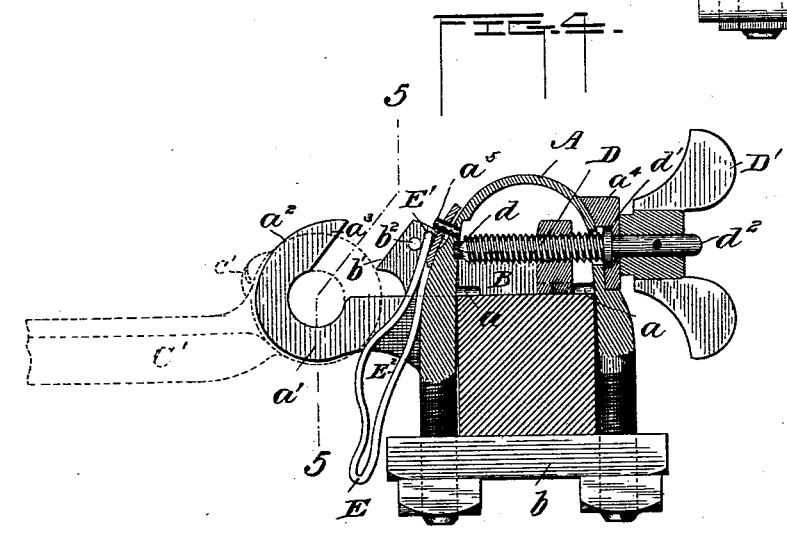
WITNESSES
INVENTOR
Orrin T. Welch
By Butterworth & Dowell
Attorneys

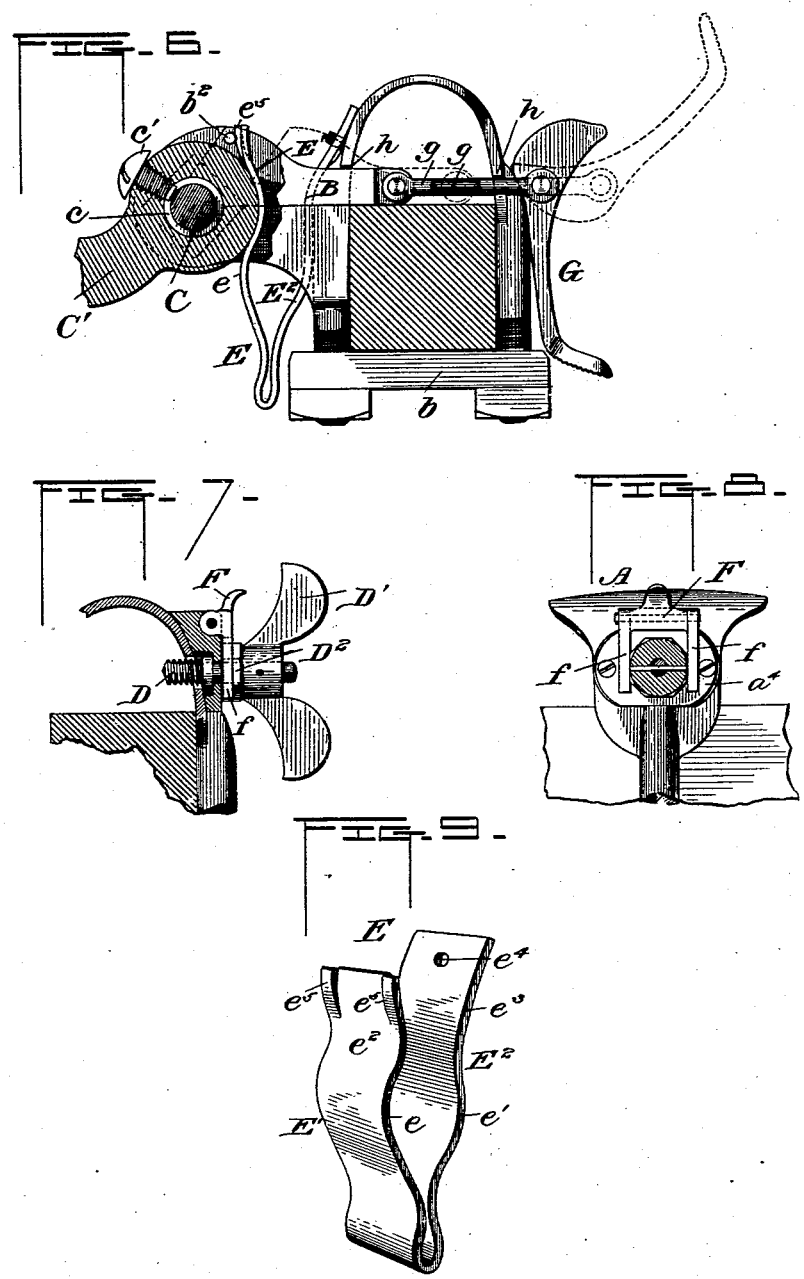

UNITED STATES PATENT OFFICE.

ORRIN T. WELCH, OF TOPEKA, KANSAS.

THILL-COUPLING.

SPECIFICATION forming part of Letters Patent No. 471,690, dated March 29, 1892.

Application filed October 10, 1891. Serial No. 408,295. (No model.)

*To all whom it may concern:*

Be it known that I, ORRIN T. WELCH, a citizen of the United States, residing at Topeka, in the county of Shawnee and State of Kansas, have invented certain new and useful Improvements in Thill-Couplings; and I do hereby declare the following to be a full, clear, and exact description of the invention, such as will enable others skilled in the art to which it appertains to make and use the same.

My invention relates to improvements in thill-couplings; and the primary object of the invention is to provide means whereby the thills or shafts of vehicles may be easily and quickly attached to and detached from the axle of the vehicle without the use of a wrench or other tool and secured in position for use in a safe and reliable manner.

A further object is to provide an anti-rattling device or spring which may be attached to the thill-coupling and retained thereon ready for use whether the thills are attached to or detached from the vehicle, and which will not be liable to be lost nor subject to displacement in removing and replacing the thill-irons, as is usual with devices of this character heretofore in use.

The object is, finally, to provide a thill-coupling of the character referred to which may be manufactured at a small cost and placed upon the market for use upon vehicles generally, and which shall be simple in construction and reliable and efficient in use.

With these several objects in view the invention consists in a thill-coupling comprising certain improved features of construction and combination of parts, all as will be hereinafter described, and particularly pointed out in the claims at the end of this description.

Referring to the accompanying drawings, forming a part of this specification, Figure 1 represents a side elevation of the invention applied to an axle. Fig. 2 is a plan of the same. Fig. 3 is a rear view thereof. Fig. 4 is a central longitudinal section. Fig. 5 represents a section taken on the line 5 5 of Fig. 4. Fig. 6 is a side elevation, partly in section, of a modification of the invention. Fig. 7 is a detail sectional view showing a locking device or keeper for the adjusting-screw, and Fig. 8 is a rear view of the same. Fig. 9 is a detached perspective view of the anti-rattling spring.

Like letters of reference are used to denote like parts in each of the several views.

A represents a U-shaped clip embracing an ordinary axle and provided with inwardly-projecting lugs $a$ and with a cross-bar $b$, between which cross-bar and lugs the axle is clamped by means of the nuts on the ends of the yoke or clip A in the usual manner. The clip A is also provided with ears $a'$, which terminate in hooked portions $a^2$, so as to provide seats or bearings to receive the usual cross pin or bolt secured to the thill-iron.

B represents a sliding U-shaped locking-plate, which has outwardly-beveled ends $b'$, adapted to fit the inwardly-beveled ends $a^3$ of the hook-shaped ears $a'$ when the parts $a^3$ $b'$ engage each other, whereby the locking-plate will be securely retained in position and braced against displacement by the backward pressure exerted by the cross-pin on the thill-irons. The locking-plate is adapted to slide back and forth upon the upper surface of the axle, and I preferably use an adjusting-screw D for accomplishing this adjustment. The forward end of the screw is stepped in a recess in the clip A at $d$, and near its rear end the screw has a collar $d'$, which is seated in a recess in a cap-piece $a^4$, detachably secured to the clip A in any suitable manner, said collar serving to retain the adjusting-screw against endwise movement by resting snugly within said recess between the cap-plate and body of the clip, through which it passes, but permitting the screw to freely rotate. On the rearwardly-projecting end $d^2$ of the adjusting-screw is secured a butterfly-nut or thumb-piece D', by which the screw may be rotated to cause the locking-plate B to slide forward and back for the purpose of engaging and disengaging the hooked ears $a'$, so as to secure the thill-irons in the coupling. The forwardly-projecting arms of the locking-plate B are provided with a cross-bar or inwardly-projecting pins or lugs $b^2$, and the clip A is provided with a similar forwardly-projecting lug or pin $a^5$, either cast therewith or secured thereto, and on which is fitted one branch or limb of a bifurcated anti-rattling spring E. The spring E preferably consists of a flat steel plate doubled upon itself, as shown, and having each limb bulged centrally, as at $e$ $e'$ in Fig. 9, and concaved, as at $e^2$ $e^3$, so as to form seats on the front and rear limbs, respectively, to fit the convex portions of the thill-iron and clip, against which they rest, as shown in Figs. 1 and 6. The front branch or arm $E'$ of the spring is adapted to rest against the lugs or pins $b^2$ $b^2$ of the locking-plate, while the rear limb $E^2$ is suspended upon the pin $a^5$, which passes through a perforation $e^4$ in said spring. By thus causing the spring to bear upon the pins $b^2$ $b^2$ it will exert a constant pressure, tending to force the locking-plate B forward against the force of the adjusting-screw when the latter is rotated for the purpose of withdrawing the locking-plate, and when said plate is adjusted to the position indicated in Fig. 4 the arm $E'$ of the spring will be drawn back out of the path of the cross pin or bolt C, carried by the thill-iron $C'$, so as to permit the latter to be detached from the coupling or replaced therein without coming in contact with the spring and without rendering it necessary to remove the latter. This feature of my invention is important for the reason that it dispenses entirely with the necessity of removing the anti-rattling spring when it is desired to detach the thills, and thereby prevents loss of the spring, which frequently occurs with such devices as are now in common use. The spring is retained in position upon the coupling in any position of the locking-plate, and when the latter is moved forward so as to lock the pin C in the coupling the spring will bear upon the rear end of the usual gooseneck thill-iron in the usual manner and prevent rattling. Similar results might be accomplished by providing the spring with the pins and perforating and slotting the clip and locking-plate to receive the pins; but I prefer the arrangement described and shown. With the construction shown in Sheet 1 of the drawings when the locking-plate is in its foremost position the lugs or pins $b^2$ will have released the spring, so as to permit the latter to bear upon the rear portion of the thill-iron, as indicated in Fig. 2, and in this position will cease to exert any inward pressure upon the locking-plate; but in order that this pressure may be constantly exerted so as to tend to force the locking-plate inward at all times I may slit the arm $E'$ of the spring, as shown in Figs. 6 and 9, so as to provide forwardly-bent auxiliary springs $e^5$, which abut against the pins $b^2$ and exert an inward pressure or pull upon the locking-plate in whatever position the latter may be. The pins $b^2$ project inward sufficiently to engage the main portion of the spring intermediate the springs $e$, so as to relieve the pressure upon the auxiliary spring when the arm $E'$ is drawn back to the position indicated in Fig. 4.

It may sometimes be desirable to provide positive means for insuring the retention of the adjusting-screw in position when the locking-plate is thrown forward to secure the thill-coupling in place, and a simple device for this purpose is shown in Figs. 7 and 8, wherein the shank $D^2$ of the thumb-nut is made polygonal and a latch or locking device F is pivoted to the clip A and provided with arms $f$ $f$, which embrace the polygonal shank of the adjusting or thumb nut $D'$ and lock the same in the desired position.

It will be understood, of course, that the locking-plate may be operated in a number of ways without departing from the principle of my invention. In Fig. 6 I have shown a modification of the device for operating said plate, in which a simple cam-lever G is connected by means of links $g$ to the rear cross-bar of the locking-plate, so that the latter may be thrown back by simply lifting the rear end of the lever to the position indicated in dotted lines in said figure, and the plate will be locked in its foremost position by the action of the spring E. To prevent the locking-plate from rising or being lifted off its seat in its forward and backward movements, I have shown the clip as being notched at $h$, so that the overhanging shoulders formed by said notches will rest upon the upper edge of the plate and retain the same in proper position.

The cross pin or bolt C may be of the usual construction; but I preferably provide a bolt having a central groove or depression $c$ to receive the end of a set-screw $c'$, which projects through an interiorly-screw-threaded opening in the base of the thill-iron $C'$ into said groove and prevents sidewise movement of the bolt. By this means the bolt will be retained in the thill-iron whether or not the usual nut is provided or drops off in use.

It will be understood, of course, that the construction and arrangement of parts described and shown may be varied in a number of ways which will readily suggest themselves to a skilled mechanic without departing from the spirit of my invention, and hence I do not desire to be limited to the exact construction described and shown.

Having thus described my invention, what I claim, and desire to secure by Letters Patent, is—

1. In combination with the clip having the projecting ears with hooked inwardly-beveled ends to receive the transverse pin of the thill-iron, the sliding locking-plate having its ends beveled outwardly to engage the reversely-beveled ends of the hooks, and the swiveled adjusting-screw having the screw-threaded connection with said sliding plate, whereby the latter may be positively adjusted for the purpose of locking and unlocking the thill-iron, substantially as described.

2. In combination with the clip provided with ears having the hooked inwardly-beveled ends, the sliding U-shaped locking-plate embracing one arm of said clip and having its ends beveled outwardly to correspond with the reversely-beveled ends of the hooks when said parts engage each other, and an adjusting device connected to said sliding plate, substantially as described, for moving and locking said plate in engagement with said hooks so as to firmly secure the transverse pin of the thill-iron in its seat, substantially as set forth.

3. In combination with the clip having the projecting hook-shaped ears, the adjustable locking-plate, the anti-rattling spring suspended between said clip and sliding plate and adapted to force said plate into engagement with said ears, and means for adjusting said plate and spring so as to permit the removal of the thill-iron without disengaging the spring, substantially as described.

4. In combination with the clip having the projecting hook-shaped ears, the sliding locking-plate, the anti-rattling spring supported between said clip and plate, and means for simultaneously adjusting the locking-plate and compressing the spring so as to permit the removal of the thill-iron without interfering with the attachment of the spring, substantially as described.

5. In combination with the clip having the ears adapted to receive the transverse pin of the thill-iron and the pin projecting therefrom, the adjustable sliding locking-plate having the forwardly-extending arms provided with inwardly-projecting pins, and the interposed anti-rattling spring-plate suspended by one of its arms on the pin of the clip and having its free arm arranged to bear upon the inwardly-projecting pins of the locking-plate, substantially as described.

6. In combination with the clip having the projecting lug or pin thereon, the bifurcated anti-rattling spring having one of its branches secured to said lug, and the sliding locking-plate engaging the other branch of said spring, whereby the spring may be compressed to permit the attachment or removal of the thill-iron without detaching the spring, substantially as described.

7. In combination with the clip having the ears with hooked ends, the sliding locking-plate adapted to engage said hooks, the interposed bifurcated anti-rattling spring having one of its arms secured to the clip and the other arm arranged to engage said locking-plate, so as to force the latter into engagement with the hooks, and means for adjusting the locking-plate so as to permit the thill-iron to be removed without removing or displacing the spring, substantially as described.

8. In combination with the clip having the ears with hooked ends and the forwardly-projecting pin thereon, the sliding locking-plate, and the anti-rattling spring suspended by one of its arms upon the projecting pin of the clip and provided with auxiliary springs upon its free arm, adapted to engage pins upon the locking-plate, substantially as set forth.

9. In combination with the axle-iron, the U-shaped clip formed with ears having hooked ends and the inwardly-projecting lugs, the clip being arranged to straddle the axle-iron with said lugs resting thereon, the cross-bar, and means for securing said bar upon the clip, whereby the axle-iron is embraced and firmly clamped between said lugs and bar with the looped portion of the clip projecting above the axle-iron, together with the sliding locking-plate and the adjusting-screw swiveled in the looped portion of said clip above the axle-iron, substantially as described.

10. In combination with the clip having the hoop-shaped ears, the sliding locking-plate, the swiveled adjusting-screw provided with a thumb-piece having a polygonal shank, and the pivoted latch or locking device adapted to engage said shank, so as to prevent the rotation of the screw, substantially as described.

11. In combination with the U-shaped clip having the looped portion projecting above the axle-iron and having the hooked ears with seats therein to receive the transverse pin of the thill-iron, the U-shaped sliding locking-plate working above the axle-iron within the loop or bow of the clip and having the forwardly-projecting arms adapted to embrace one of the arms of the clip, and the adjusting-screw swiveled in the looped portion of the clip and having its screw-threaded portion in engagement with the rear cross-bar of the sliding-plate, substantially as described.

In testimony whereof I affix my signature in presence of two witnesses.

ORRIN T. WELCH.

Witnesses:
BENJ. W. DOUGHTY,
W. D. KERSHAW.